United States Patent [19]

Erickson

[11] 4,357,308
[45] Nov. 2, 1982

[54] DUAL TEMPERATURE DUAL DESULFURIZATION

[76] Inventor: Donald C. Erickson, 1704 S. Harbor La., Annapolis, Md. 21401

[21] Appl. No.: 157,239

[22] Filed: Jun. 6, 1980

[51] Int. Cl.³ .............................................. B01D 53/34
[52] U.S. Cl. ................................ 423/210.5; 423/232; 423/234; 423/539; 423/563; 423/574 R; 423/DIG. 12
[58] Field of Search ...................... 423/210.5, 232, 233, 423/234, 563, 574 R, 539, DIG. 12

[56] References Cited

U.S. PATENT DOCUMENTS

| | | | |
|---|---|---|---|
| 1,440,977 | 1/1923 | Espenhahn | 423/232 |
| 1,678,630 | 7/1928 | Bahr | 423/539 |
| 3,438,722 | 4/1969 | Heredy et al. | 423/210.5 |
| 4,173,619 | 11/1979 | Erickson | 423/210.5 |
| 4,207,298 | 6/1980 | Erickson | 423/210.5 |

Primary Examiner—Earl C. Thomas

[57] ABSTRACT

A fuel gas is desulfurized while hot by contact with a molten alkali salt. The salt is regenerated for further use by contact with a recirculating gas stream. The $H_2S$ and COS picked up by the recirculating gas stream is scrubbed at low temperature in an aqueous alkaline salt scrub system such as hot potash. $H_2S$ regenerated from the low temperature alkaline scrub system is subsequently converted to sulfur. By combining both high temperature and low temperature alkali scrubbing in a single dual temperature dual alkali (DTDA) process, the best advantages of both scrub techniques are retained whereas the serious disadvantages of molten salt scrubbing are eliminated.

4 Claims, 1 Drawing Figure

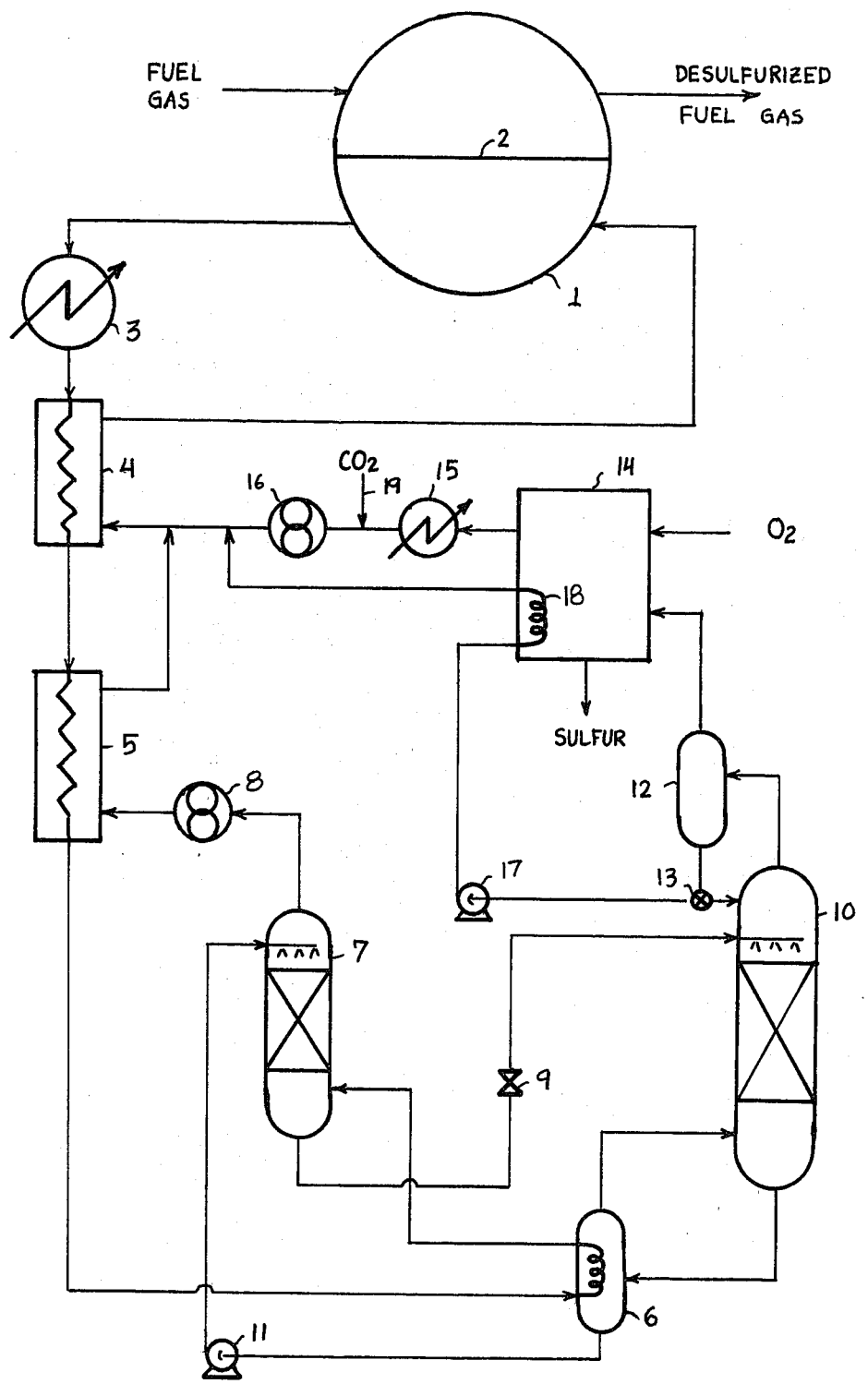

DUAL TEMPERATURE DUAL DESULFURIZATION

TECHNICAL FIELD

The invention relates to a process wherein gaseous sulfur species ae scrubbed from a high temperature reducing gas such as low or medium BTU gas, using a molten alkali salt scrubbing medium which is regenerated in the process.

Several problems have been encountered in prior art attempts at hot reducing gas desulfurization using molten alkali salt. First is the problem of simultaneously achieving a high degree of scrub and an efficient regeneration (i.e. low consumption of steam plus $CO_2$). Unfortunately these objectives are in direct opposition, and attempts to achieve both have led to adoption of more complex flowsheets incorporating temperature swing, pressure swing, or multiple countercurrent staging. Another severe problem has been identified—the fact that the salt has a tendency to chemically transfer gaseous fuel species CO and $H_2$ from the gas being scrubbed to the regeneration gas. Typically the amount transferred is comparable to the amount of $H_2S$ transferred. Thus the concentrations are so low as to preclude useful recovery, yet high enough to represent a serious energy loss, in comparison to other scrubbing techniques.

DISCLOSURE OF INVENTION

The above and other problems are solved by adopting a recirculating gas stream as the medium by which the spent molten alkali salt is regenerated. The recirculating stream consists predominantly of steam plus $CO_2$, but importantly also contains small concentrations of hydrogen and CO, in the range of 1 to 12% each. This gas stream picks up $H_2S$ (and COS) as it regenerates the molten salt. It is then scrubbed in a conventional aqueous alkaline scrub system, such as hot potassium carbonate, in order to efficiently recover $H_2S$ and also cleanse the recirculating gas stream. The recirculating gas stream is then recycled to additional molten salt regeneration.

In overview, the sulfur in the fuel gas stream is first transferred to a recirculating molten salt stream, then to a recirculating regeneration gas stream, and finally to a recirculating aqueous alkaline salt stream from which it emerges as concentrated $H_2S$. The operating conditions are set such that the scrub is sufficiently thorough, i.e. that the desired percentage of sulfur (up to 95%) is removed from the fuel gas. This unavoidably implies an inefficient regeneration—typically twenty moles of steam plus $CO_2$ is required in the recirculating stream per mole of $H_2S$ scrubbed out of the salt (i.e. gas $H_2S$ concentration approximates 5%). However, since the unused steam plus $CO_2$ is recirculated for additional use, the overall process has a much higher regeneration efficiency. The overall regeneration efficiency is established by the efficiency with which the aqueous alkaline salt scrub system purifies the recirculating gas stream, and aqueous alkaline salt scrubbing systems are characteristically highly efficient.

The second major advantage of the recirculating regeneration gas stream is that the relatively low $H_2$ plus CO concentrations in it strongly suppress any further loss of fuel species out of the fuel gas. The chemical reaction equilibria most illustratrative of this characteristic are:

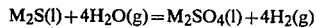

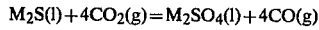

where M represents the mixture of alkali cations in the melt. The equilibrium constants of the above reactions plus the fact that they are fourth power in the gaseous species results in there being an extremely strong tendency for some of the alkali sulfide to be oxidized to sulfate in the presence of steam plus $CO_2$. Yet once relatively small $H_2$ plus CO concentrations have resultingly built up, on the order of 5 to 10%, the tendency for further reaction becomes extremely small. The recirculating gas stream takes advantage of this characteristic by maintaining appropriately small concentrations.

In comparison to conventional fuel gas desulfurization processes in which the entire fuel gas stream is cooled down, scrubbed in an aqueous system, and then reheated to use temperature, this process provides several advantages. First, only approximately one half as much gas or less must be cooled, scrubbed, and then reheated, since the $H_2S$ concentration in the recirculating gas is typically four times that in the fuel gas. Thus all affectd components (heat exchangers, scrub towers, etc.) can be correspondingly smaller. Secondly, the much lower CO concentration in the recirculating gas relative to the fuel gas eliminates the possibility of carbon deposition from the reverse Boudoard reaction during cooldown and heatup. Finally the fuel gas pressure is not decreased by the scrubbing train.

BRIEF DESCRIPTION OF THE DRAWING

The FIGURE is a schematic flowsheet of one preferred embodiment of the disclosed process.

The molten salt containment vessel 1 contains a baffle 2 dividing it into scrub and regeneration regions. Sour fuel gas is injected into the scrub region and desulfurized fuel gas is withdrawn from the scrub region. The salt circulates under the baffle to the regeneration region, where it is regenerated by the recirculating gas stream. The recirculating gas stream exiting the regeneration region is cooled in nonregenerative heat exchanger 3 and regenerative heat exchangers 4 and 5. It is further cooled (and partially condensed) in reboiler 6, and then scrubbed of $H_2S$ in absorption tower 7. Compressor 8 circulates the scrubbed recirculating regeneration gas back through regenerative heat exchangers 5 and 4 to the molten salt vessel, completing the cycle. The rich aqueous alkaline salt solution from the scrub tower 7 is routed through means for pressure reduction 9 to desorption tower 10, where concentrated $H_2S$ plus some steam, $CO_2$ etc. are flashed off. The lean solution is then routed through reboiler 6 and pump 11 back to the absorption tower. Reflux condenser 12 condenses steam from the overhead product, and proportioning valve 13 proportions condensate between tower reflux and makeup feed. The $H_2S$ plus molecular oxygen are supplied to the Claus unit 14, yielding sulfur plus an exhaust steam-$CO_2$ mixture. The requirement for makeup steam and $CO_2$ in the recirculating gas stream due to $H_2S$ formation can be partly supplied by that exhaust stream, e.g. using cooler 15 and compressor 16 (provided oxygen rather than air is supplied the Claus unit). Additional steam makeup can be obtained from the makeup feed by using pump 17 and boiler 18 which is supplied by Claus process reject heat. If air is supplied to the claus unit, other makeup $CO_2$ will be required, e.g. pipeline 19. One advantage of using Claus exhaust directly as makeup is that no tail gas treatment is then required.

Best Mode for Carrying Out the Invention

The operating conditions and comparative advantages of this process are best illustrated by citing numerical flow sheet results. Table I presents such data, derived from a computerized model of the process. A medium BTU gas at 1350 K and 12.5 atm and having the composition shown in the table is to be scrubbed. The composition is typical of that resulting from oxygen partial oxidation of Illinois #6 coal (4.3% sulfur). The table presents results from two different processes, each incorporating a single salt scrub; one having once through regeneration, and the other having recirculating regeneration as depicted in the FIGURE. For both cases, the salt bath is comprised of 80% sodium cations and 20% potassium cations, and the salt temperature is approximately 1100 K. The salt circulation rate between scrub and regeneration regions is approximately 1 mole for every 4 moles of fuel gas scrubbed. The regeneration gas is supplied to each salt melt at 850 K, and at a molar flow rate of 60% of the fuel gas flow rate.

For each case, the table shows the equilibrium gas composition and salt composition present in each region of the salt melt. The important points of comparison between the two processes are the extent to which sulfur species are scrubbed from the fuel gas, the required consumption of regeneration gas, and the amount of $CO+H_2$ lost from the fuel gas. As shown, the once through process reduces sulfur species from 5 moles to 1.2 moles (76% scrub), whereas the DTDA recirculating process reduces it to 0.85 moles (83% scrub). The once through process requires 190 moles of steam and 93 moles of $CO_2$ for that extent of scrubbing, whereas the DTDA process requires only 4.8 moles of steam and 4.7 moles of $CO_2$. Similarly, the once through process removes 13 moles of $CO+H_2$ from the fuel gas, whereas the DTDA process only removes 1.1 moles. Thus the DTDA process, in addition to providing a small improvement in level of scrub, has also provided an order of magnitude reduction of the regeneration gas requirement and the amount of $CO+H_2$ transferred out of the fuel gas.

The composition of the desulfurized regeneration gas which is recirculated back to the molten salt bath is determined by the net removal of gases accomplished in all of the low temperature scrubbing equipment plus the amount of makeup gas added. One important parameter is the $H_2S$ content of the returning gas. This value will typically be 10% of the $H_2S$ level in the spent regeneration gas. This 90% level of removal will be achieved for example if the aqueous scrubber removes 94% of the sulfur, and the Claus unit condenses out 96% of the sulfur in its feed (two converters).

A small amount of CO and $H_2$ is scrubbed out of the recirculating gas in the aqueous scrubber, and is subsequently oxidized in the Claus unit. This will amount to approximately 0.25 moles $CO+H_2$ per mole $H_2S$ scrubbed—an insignificant amount. However it is sufficient to keep the $CO+H_2$ content of the recirculating gas below 10%, and thus prevents any significant degradation in regeneration efficiency.

The stoichiometric makeup gas requirement is 1 mole of $CO_2$ per mole of $H_2S$ scrubbed. There is no net requirement for steam in addition to $CO_2$, since for every mole of $H_2S$ scrubbed a mole of $H_2O$ is yielded in the Claus unit, which can be recirculated. On the other hand, makeup steam can be substituted for makeup $CO_2$, since the steam will react with and derive $CO_2$ from the molten salt. This is generally not desirable on two counts. First it increases the salt hydroxide level, which increases the alkali vapor pressure. Secondly, it establishes a high $pH_2O$ in the recirculating gas, which in turn requires extra condensation and reboiling at the low temperature end.

Thus ratios of $pCO_2/pH_2O$ in the recirculating gas on the order of 2 or larger are desirable, and turn out to be very easy to achieve. It has been found that a very slight increase in makeup $CO_2$ over the stoichiometric amount results in a large change in the ratio of $CO_2$ to $H_2O$ in the recirculating gas. For example, whereas a makeup $CO_2$ rate of 1 mole per mole $H_2S$ yields approximately equal $pCO_2$ and $pH_2O$ in the recirculating gas, increasing that rate to 1.1 moles $CO_2$ per mole $H_2S$ will give a $pCO_2/pH_2O$ ratio of greater than 3 in the recirculating gas. In other words, a high degree of control is available over the recirculating gas composition without any substantial change in the makeup gas requirement.

Alternative Embodiments

Several variations of the above process provide further advantages. One variation is to provide 2 separate salt baths, where the regeneration gas flow to the two baths is countercurrent to the fuel gas flow, as disclosd in the cited prior art. With this variation, it is possible to halve the sulfur remaining in the scrubbed gas, or halve the required regeneration gas flow rate, or any combination of the two. It is also possible to use pure sodium salt in the first stage bath, such that the cost of purge due to flyash accumulation becomes insignificant. A booster fan is required to boost the regeneration gas from the lower pressure second bath to the higher pressure first stage bath.

A second variation is to partially scrub the fuel gas in a single stage DTDA process, and then complete the fuel gas scrub with an oxygen regenerable sulfur scrubber (ORSS). ORSS materials are metals or metal oxides which desulfurize fuel gas by forming metal sulfides, and which are subsequently regenerated by air or oxygen to yield $SO_2$. Since the same reversible reaction is not involved in both scrub and regeneration, as with molten salt scrubbing, ORSS scrubbing achieves both high scrub efficiencies and high regeneration efficiencies. Its drawback is that its product is $SO_2$, which is more difficult to convert to useful form—sulfur or sulfuric acid. By combining ORSS scrubbing with a single stage DTDA process, several advantages are obtained. The $SO_2$ can be reacted directly with $H_2S$ regenerated from the aqueous alkaline salt in a Claus converter, eliminating the need for the Claus furnace. The salt is only required to perform low level sulfur removal, i.e. scrub the first two thirds of the sulfur, which it is very efficient at, whereas the ORSS material completes the scrub to a finer level than possible with salt alone, typically 97%. Of the various ORSS materials—FeO, ZnO, Cu, $Cu_2O$, Ni, HfO, MnO, and others—MnO has been found to be one of the most advantageous, as disclosd by present applicant in U.S. Patent Application Ser. No. 123,376 filed Feb. 20, 1980.

The molten alkali salt consists essentially of alkali metal carbonate, hydroxide, and sulfide, with optional inclusion of up to 30% alkaline earth cations. Salt temperatures and pressures can range from 1000 K. to 1250 K. and 1 to 30 atmospheres.

TABLE 1

| | | | SINGLE SALT BATH RESULTS | | | | | |
| --- | --- | --- | --- | --- | --- | --- | --- | --- |
| | | | ONCE THROUGH REGENERATION | | | DTDA (RECIRC. REGENERATION) | | |
| | SPECIES | FUEL GAS IN | FUEL GAS OUT | REGEN GAS OUT | REGEN GAS IN | FUEL GAS OUT | REGEN GAS OUT | REGEN GAS IN |
| GAS COMPO-SITION | $H_2O$ | 89 | 54.4 | 176 | 190 | 47.2 | 80.2 | 85 |
| | $H_2$ | 133 | 134 | 10 | | 141 | 9.9 | 9 |
| | $CO_2$ | 41 | 115 | 86.3 | 93 | 111 | 173.4 | 178.1 |
| | CO | 196 | 107 | 3 | | 111 | 10.5 | 10.3 |
| | $H_2S$ + COS | 5 | 1.2 | 3.8 | | 0.85 | 4.6 | 0.45 |
| | $CH_4$ | 4 | 23 | | | 23 | | |
| | TEMP. (K) | 1350 | 1123 | 1026 | 850 | 1149 | 1068 | 850 |
| SALT | MOH | | 1.24 | 1.33 | | 1.38 | 0.86 | |
| | $M_2CO_3$ | | 109.3 | 113 | | 108.4 | 112.8 | |
| | $M_2SO_4$ | | 0.01 | 3.25 | | 0.01 | 0.32 | |
| | $M_2S$ | | 10.06 | 3.04 | | 10.86 | 6.4 | |

UNITS: MOLES/SECOND
M: 80% Na, 20% K
PRESSURE: 12.5 ATM.

I claim:

1. In a continuous process in which a high temperature reducing gas is scrubbed of $H_2S$ by contact with at least one molten alkali salt scrubbing medium, which is regenerated for reuse, the improvement which comprises:
   a. regenerating the molten salt by contacting it with a recirculating gas stream comprised essentially of $H_2O$, $CO_2$, $H_2$, and CO, whereby $H_2S$ is introduced into the recirculating gas stream;
   b. scrubbing the $H_2S$ from the recirculating gas stream using an aqueous alkaline salt scrubbing medium;
   c. recycling the recirculating gas stream to further molten salt regeneration;
   d. adding a makeup gas consisting essentially of $CO_2$ optionally admixed with $H_2O$ to the recirculating gas stream.

2. The process according to claim 1 wherein the $H_2$ and CO composition of the recirculating gas stream are both maintained in the range of 1 to 12%, and the molten salt temperature and pressure are in the respective ranges 1000 K. to 1250 K. and 1 to 30 atmospheres.

3. The process according to claim 2 wherein the $CO_2$ to $H_2O$ ratio in the recirculating gas stream is maintained greater than two.

4. The process according to claim 1 comprising the additional steps of:
   a. scrubbing the said high temperature reducing gas with an oxygen regenerable sulfur scrubber subsequent to scrubbing it with the molten alkali salt;
   b. regenerating the oxygen regenerable sulfur scrubber with a molecular oxygen containing gas, thereby yielding $SO_2$,
   c. combining the $SO_2$ with the $H_2S$ obtained from regenerating the aqueous alkaline salt scrubbing medium so as to form elemental sulfur.

* * * * *